United States Patent [19]
Kaufman et al.

[11] Patent Number: 6,122,264
[45] Date of Patent: Sep. 19, 2000

[54] METHOD FOR MANAGING THE TRANSMISSION OF COMPETING INFORMATION PACKETS

[75] Inventors: Joseph Samuel Kaufman, Holmdel; Sanjiv Nanda, Plainsboro, both of N.J.

[73] Assignee: Lucent Technologies, Inc., Murray Hill, N.J.

[21] Appl. No.: 08/939,454

[22] Filed: Sep. 29, 1997

[51] Int. Cl.[7] .................................................. H04Q 7/00
[52] U.S. Cl. ........................... 370/331; 370/336; 370/349
[58] Field of Search ..................................... 370/329, 335, 370/336, 337, 341, 342, 343, 347, 431, 441, 442; 375/356

[56] References Cited

U.S. PATENT DOCUMENTS

| | | | |
|---|---|---|---|
| 5,327,467 | 7/1994 | De Gaudenzi et al. | 370/342 |
| 5,742,588 | 4/1998 | Thornberg et al. | 370/329 |
| 5,809,426 | 9/1998 | Radojevic et al. | 375/356 |
| 5,850,392 | 12/1998 | Wang et al. | 370/337 |

*Primary Examiner*—Michael Horabik
*Assistant Examiner*—Prenell Jones
*Attorney, Agent, or Firm*—Gibbons Del Deo, Dolan, Griffinger & Vecchione

[57] ABSTRACT

A method and system are provided for reducing skew-group blocking in a CDMA wireless system, or similar such blocking in any information transmission system characterized by packet arrivals associated with a given connection occurring at multiples of a fixed timing interval (frame), and where packet arrivals associated with different connections need to be dispersed within that interval. The system assigns competing connections to sub-intervals within a timing interval for such an information transmission systems, and causes a request from an information source for assignment to a specific sub-interval to be acted on pursuant to an evaluation of the impact that the grant of such a request for the specific sub-interval assignment will have on a transmission delay for packets assigned to succeeding sub-intervals in the timing interval.

18 Claims, 1 Drawing Sheet

METHOD FOR MANAGING THE TRANSMISSION OF COMPETING INFORMATION PACKETS

FIELD OF THE INVENTION

This Application is related to the art of signal transmission in a digital medium, and more particularly to the management of competing information packets in such a medium.

BACKGROUND OF THE INVENTION

The transmission of information between a sender and a receiver is now largely handled and processed in a digital form—i.e., the signal information is represented as a sequence of discrete values, even though the original state of the information may have been in an analog form. Where the original information is intrinsically analog (e.g., human speech) a conversion of that analog information to a digital form is typically carried out by sampling the analog waveform at discrete intervals, and quantizing the sampled analog information into a finite set of discrete values (typically represented as binary "words").

In the transmission of digital information, sets of such discrete values comprising a small time increment of the original signal are usually grouped together into packets. It is also normally the case that the packets corresponding to an information signal from a particular source will be interspersed with packets from competing information sources (rather than all of the packets for a given information source being transmitted as a continuous stream). Some applications also require that a strict timing relationship be maintained in a transmission medium between information packets belonging to the same source and destination pair.

The field of wireless telephony provides a useful example of problems arising from the necessity to manage the sequencing or timing of information packets from competing sources over a common transmission medium. It is noted that, for purposes of this example, for each packet connection, either the information source or the destination may be a mobile unit of a wireless system.

Many wireless communications systems utilize the digital medium for transmission and processing of information from a source to a destination receiver. Moreover, as older analog mobile units are phased out over the next several years, essentially all wireless communication is expected to become digital. For such digital wireless systems, various "multiple access" methods have evolved to accommodate the multiple sources which must share a common portion of the wireless frequency spectrum. The principal such methods are known as Frequency Division Multiple Access (FDMA), Time Division Multiple Access (TDMA), and Code Division Multiple Access (CDMA). All of these methods are well-known in the art of wireless communication. Nonetheless, as the illustrative example described herein is based on use of CDMA technology, some of the salient characteristics of CDMA will be briefly described hereafter.

With Code Division Multiple Access, multiple users share the same frequency band at the same time. Unique channels are created by having each user directly modulate its information signal by a unique, high-bit-rate code sequence that has minimal correlation with that assigned to any other user. At the other end of the RF transmission path, that modulated information signal is demodulated to recover the actual information signal.

For purposes of the example, consider a CDMA information signal transmitted over an air interface between a mobile station and an RF receiver at a base station. The received RF signal is then demodulated at the base station and the demodulated signal transmitted—usually over a wired transmission facility—to a switching/processing center serving that and other base stations, and which is usually physically separated from the base stations. The transmission facility between the base station and the switching/processing center, denoted hereafter as a packet transmission facility (PTF), is sized to accommodate the anticipated packet traffic from the mobile stations served by the base station, subject to a specified packet loss and delay requirement. At the switching/processing center, packets from each served mobile station are then identified from among the multiplicity of such packets traversing the PTF and reassembled into the specific information signals transmitted by each such mobile station. Such reassembled information signals are then sent on to the ultimate destination of the signal, generally via the Public Switched Telephone Network (PSTN) or a Public Data Network (PDN).

CDMA systems (as well as other such systems) operate pursuant to various "standards" which are established to promote compatibility among CDMA equipment provided by different suppliers for such equipment. One of these CDMA standards is designated as the IS-95A CDMA Common Air Interface, which is established under the aegis of the Telecommunications Industry Association TR 45.5 subcommittee. In an IS-95 CDMA wireless system, packets on the air interface are referred to as "frames", with each frame containing 20 msec of source information. The number of information bits in a given CDMA frame varies according to the level of speech activity represented by that frame—i.e., active speech will be represented by more bits per frame than will silence.

With many CDMA systems, mobiles acquire their timing from the base stations, with the base station transmission providing the timing reference. (Base stations in turn normally acquire their timing via the Global Positioning Satellite (GPS) system).

A problem that may arise from this arrangement is that all mobile stations could transmit their frames at substantially the same time, and, in that circumstance, all such frames would arrive at the base station, for transmission via the PTF to the switching/processing center, at substantially the same time (differing only by propagation time differences for the signals from the served mobiles). Absent the use of a PTF with a very high bandwidth (an uneconomic choice), packets may experience substantial queuing delay and this is known to have a deleterious effect on speech quality.

To address this problem, the IS-95A CDMA Common Air Interface standard permits different mobile stations to offset their frame transmissions in 1.25 msec intervals from the 20 msec timing reference. IS-95A specifies sixteen evenly spaced offsets of 1.25 msec each. With such offsets, it becomes possible to stagger frame starting times among the served mobile stations so that the queuing times of the packets from those mobiles is reduced.

A common choice in the present art is to have four evenly spaced offsets, beginning, respectively, at 0, 5, 10 and 15 msec from the timing reference. Such an arrangement, for a single frame, is illustrated in FIG. 1, where the interval between 0 and 5 msec. is designated as "skew group" 0, the interval between 5 and 10 msec. as skew group 1, and so on. The call assignment status for each skew group is illustrated symbolically by vertical compartments framing each such skew group. For each such skew group so illustrated, calls in progress from served mobiles are indicated by "X"s. Thus skew group 0 is seen to have 3 calls assigned, skew group 1: 4 calls, skew group 2: 3 calls, and skew group 3: 4 calls. It can also be seen that, with this prior art methodology, the maximum number of mobiles assigned to a given skew group (4 for the illustrated case) is one quarter of the total number of mobiles which may be handled by the PTF.

The PTF bandwidth is sized to carry a prescribed number of maximum-sized packets in a 20 msec interval. In the prior art, the maximum number of mobiles allowed to share a skew group is such that the sum of their packet transmission times over the PTF will not exceed the offset interval—for the illustrated case of four skew groups, that offset interval being 5 msec. Thus, as illustrated in FIG. 1, there is no "spillover" of packets from one skew group to another, and the maximum delay experienced by a packet is simply the offset interval (5 msec).

A particularly important attribute of CDMA wireless technology is that of the "soft" handoff, as contrasted with the "hard" handoff which characterizes most other wireless communication systems. In such a "hard" handoff, an actual break (albeit momentary) in the signal path occurs as the mobile unit is handed off from the first base station to the second base station. Under the CDMA "soft handoff" procedure, however, the mobile station commences communication with the second base station (and possibly additional base stations) without interrupting communication with the first base station—i.e., the mobile station communicates with multiple base stations simultaneously.

In this soft-handoff mode, at each frame interval, all base stations with which the mobile is communicating receive the mobile's transmitted frames. A "frame selector" is deployed at the switching/processing center to select the highest quality replica among the multiple copies of the frame received at the several base stations communication with the mobile station during that frame interval. This imposes a constraint that these multiple replicas of the frame must arrive at the frame selector at substantially the same time. In order to satisfy this constraint during soft handoff, the mobile unit must be assigned to the same skew group at all of the base stations with which it is communicating. This leads to a potential problem under the prior-art skew group procedure.

When a mobile station seeks to establish a soft-handoff with a second base station, its call must, as noted above, be assigned to the same skew group as was assigned at the first base station. However, should that second base station already have the maximum number of calls assigned to the required skew group (based on the assignment criteria previously described), a soft handoff to that second base station would be blocked. Such blocking of the soft handoff for that mobile station not only impairs signal quality for that mobile station, as it travels increasingly further from its serving first base station, but also impacts the signal quality of other mobile stations served at the second base station. This occurs because the mobile station denied a soft handoff must increase its output power to maintain an acceptable signal quality with the first base station, which in turn is likely to cause interference for the other mobile stations served by the second base station.

SUMMARY OF INVENTION

Accordingly, an object of the invention is a means for reducing skew-group blocking in a CDMA wireless system, or similar such blocking in any transmission system where call arrivals during a frame interval need to be dispersed within that interval. To that end, a method is provided for processing competing information packets through a transmission medium including the steps of:

establishing, within a timing interval for the transmission medium, a plurality of contiguous sub-intervals, wherein information packets may be assigned to each of the sub-intervals; and acting on a request from an information source for assignment to a specific one of the sub-intervals by evaluating an impact that grant of such request for the specific sub-interval assignment will have on a transmission delay for packets assigned to succeeding sub-intervals in the timing interval.

DETAILED DESCRIPTION OF THE INVENTION

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

Most information transmission systems use a periodic time structure with time divided into intervals of a fixed length. Connections using the system typically generate packets once in each such time interval. In many cases, particularly where the information content is speech related, these packets must be forwarded by the system without violating some delay constraint. A common methodology for preventing the "bunching" of packet arrivals (which leads to excessive packet delays) is a division of the basic time intervals into a set of sub-intervals, with the connections being assigned to specific sub-intervals so that each connection generates its packets in a corresponding sub-interval for every subsequent timing interval.

The CDMA cellular system discussed in the Background section above embodies these characteristics and serves as a useful illustration of the "skew-group" blocking problem occurring in the prior art, as well as the manner in which that problem is solved by the methodology of the invention. Accordingly, the discussion hereafter of the method of the invention will be focused on its application in the context of such a CDMA wireless system and that system may be considered an illustrative embodiment of the inventive methodology. It should be understood however, that the methodology of the invention extends to any application involving dispersal of competing signals within a timing interval.

Figure 1:
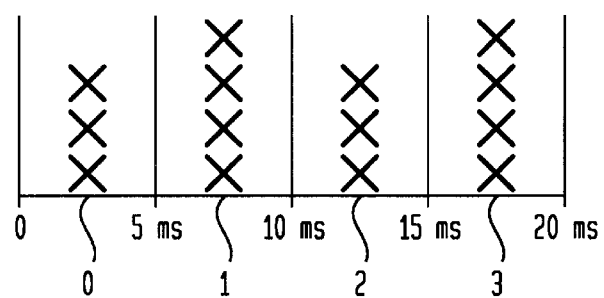
FIG. 1 provides an illustration of a basic CDMA data frame and the skew groups defined therein.

For this illustrative CDMA embodiment, a single CDMA cluster is assumed, with such cluster typically supporting up to approximately 16 active mobiles and utilizing a PTF sized for 16 mobiles. It is also noted that, for such an illustrative PTF, the transmission time for a maximum sized packet will be taken to be 1.25 msec, Thus, in a frame configured for 4 skew groups, a maximum of 4 mobiles per skew group may be established using the prior art skew group configuration (see FIG. 1, and the discussion thereof, supra). As is well known in the art, additional CDMA clusters served by a base station (or a sector thereof) will normally be paired with appropriately sized PTFs connecting that base station with the switching/processing center. It will be apparent from the discussion following that the methodology of the invention is equally applicable to the management of packets traversing such additional PTFs.

The general problem of skew group blocking was described in the Background section for a prior-art skew-group algorithm. It has been determined that, for the case of a single CDMA cluster, such skew group blocking using the prior-art skew group configuration can be from 2 to 6 times as large as call blocking. Thus, if the CDMA cluster is engineered for 2% call blocking, skew group blocking may easily exceed 10% with the prior-art configuration. In general, skew group blocking is quite sensitive to (and increases monotonically with) the average number of soft handoffs per call.

It is possible, under the IS-95A standard, to increase the number of skew groups in a frame (to a maximum of 16), and thereby to distribute both new calls as well as soft handoffs among a larger number of offsets. However, using the skew group algorithm provided in the prior art will proportionally decrease the maximum number of calls per group. Thus, for the same PTF, 8 skew groups could be established in a frame interval (2.5 msec offsets) with half as many (2) calls per skew group. Once again, this would result in the packets from one skew group clearing the PTF before the packets associated with calls in the next skew group appear—i.e., no spillover. Although such an 8 skew group configuration would cut in half the maximum PTF delay any packet could experience, skew group blocking would rise sharply since only half as many calls are permitted in each group. In short, with the skew group algorithm provided in the prior art, trading off PTF delay with skew group blocking is decidedly unattractive.

With the skew group management methodology of the invention, the inventors have recognized that the requirement of the prior-art skew group arrangement that all packets in a given skew group clear the PTF before packets associated with calls in the next group appear is an artificial constraint. The critical factor is the maximum delay which may be experienced by a packet in a skew group. With the prior-art methodology (using the 4-skew-group per frame example of FIG. 1), that maximum delay is the offset interval, and consequently no more than 4 packets may be placed in a skew group, so that all packets will clear during the offset interval.

In the following discussion of the methodology of the invention, it is convenient to refer to the delay criterion in terms of the number of packets rather than a time increment—thus, for the illustrative case here, the maximum delay of 5 msec is equivalent to a 4-packet delay. It should be noted, however, that while a 5 msec (or 4-packet) delay is acceptable in terms of its impact of speech quality, such a criterion is somewhat arbitrary, and other maximum packet delays may also occur.

A key element in the methodology of the invention is the recognition that a more appropriate criterion for deciding whether a call can be assigned to a skew group is the maximum delay experienced by a packet in any skew group as a result of admitting the call (to its requested skew group). The constraint established by the prior art that packets for calls assigned to a given skew group be cleared during the corresponding offset interval is unnecessarily restrictive. Thus, under the method of the invention, a greater number of packets is permitted in a skew group than can be cleared during the corresponding offset interval, with the excess packets being allowed to overflow from one skew group to the next, subject only to the condition that no packet (in any skew group) experiences a delay exceeding a maximum delay constraint D. By applying this idea, particularly in combination with the use of a larger number of skew groups, a substantial reduction in the level of skew group blocking can be achieved.

Figure 2:
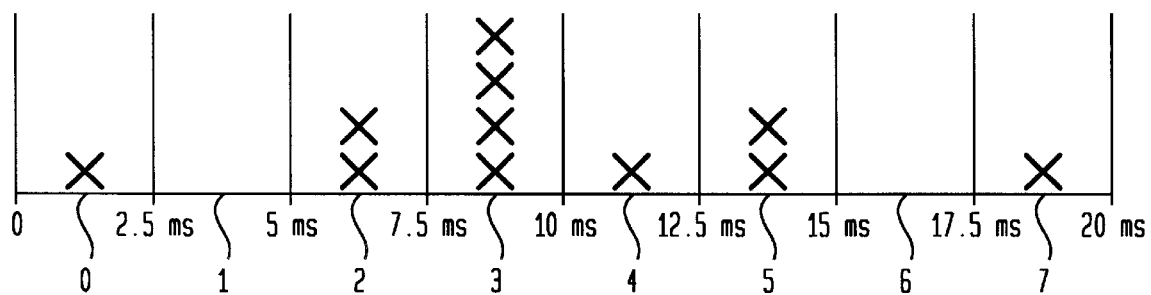
FIG. 2 depicts an illustrative 8 skew group allocation according to the method of the invention.

An illustrative application of the method of the invention is shown in FIG. 2, using 8 skew groups per frame and with a maximum delay criterion D=4 (packets). With such an 8 skew-group configuration, each offset interval is 2.5 msec. in duration, as illustrated in the figure.

As can be seen in FIG. 2, there are 4 calls up in the offset interval between 7.5 and 10 msec., designated as skew group 3 in the figure (other offset intervals being similarly designated by reference numerals indicating skew group numbers). Although this represents two more calls than can be cleared in the 2.5 msec. offset interval, the maximum delay criterion on all skew groups is met. To see that such is the case, reference to the figure will show that the maximum delay in the skew groups designated 4 and 5 will be 3, since 2 packets from group 3 will spill over to group 4, and 1 packet from skew group 4 will spill over into group 5. Thus, the maximum delay criterion (of 4 for this illustration) is not violated as the spillover from skew group 3 is propagated throughout the frame interval.

Had, however, there been three calls previously admitted to skew group 4, the fourth call in skew group 3 would not have been admitted because it would result in a maximum delay of 5 in skew groups 4 and 5, as two calls would spill over from skew group 3 to skew group 4 (which already has three calls) and three calls would then spill over from skew group 4 to skew group 5.

It can thus be seen that the dynamic skew group method of the invention enables statistical sharing among skew groups, which in turn provides a substantial reduction in skew-group blocking.

I. Implementation of Dynamic Skew Group Methodology

As described above, the prior art skew group arrangement was static in its approach for admitting a new call to a particular skew group. The methodology of the invention, on the other hand, provides a dynamic approach to such call-admission decisions, which relies on statistical sharing among the skew groups. In a preferred embodiment, the dynamic skew group processing of the invention is carried out by an algorithm which is described hereafter in terms of a pseudo code listing for the steps of the algorithm. Implementation of that algorithm from that pseudo code will be apparent to those skilled in the art for various computer architectures and/or programming languages.

The following notation is used in the pseudo code listing for the dynamic skew group algorithm:

N: Number of channel elements (receivers) per CDMA Cluster ($N \leq L \times \mu$)

L: Number of skew groups.

$\mu$: Number of maximum size packets that can be transmitted over the PTF from the instant marking the beginning of a skew-group until the beginning of the next skew-group.

$A_i$: The number of calls using skew-group i.

$S_i$: The number of packets spilling over into the transmission time corresponding to skew-group i.

D: Maximum permissible packet delay (in units of number of packets).

The skew groups are numbered from 0 to L-1, and when sequencing through skew groups is called for, it is understood to be modulo L.

The state information required by the algorithm of the invention is contained in the S and A arrays associated with each CDMA Cluster.

The dynamic skew group algorithm carries out separate processes for the cases of admitting a soft handoff call (where a predetermined skew group must be used, and the algorithm operates to determine whether or not the soft handoff may be admitted) and admitting a new call (where the algorithm determines an appropriate skew group for admission of the call). These processes are described in Sections A (soft handoff) and B (new call) below.

For engineering purposes, it is often desirable to have multiple PTFs carrying traffic for disjoint sets of channels within a base station. Each such set of channels is referred to as a CDMA cluster. The discussion of the dynamic skew group algorithm in Sections A and B below is directed to the case of a single CDMA Cluster. In Section C, the methodology is extended to the case of multiple CDMA Clusters.

A. Algorithm for Admitting a Soft Handoff

With the prior-art configuration, a soft handoff requiring skew group j can be admitted only if the number of packets in skew group j does not exceed the number of packets that can be transmitted within the offset interval. In the dynamic admission methodology of the invention, a soft handoff requiring skew group j may be admitted as long as the maximum delay D is not exceeded in any skew group. Thus, any overflow that such a placement induces must be tracked through successive skew groups to guarantee that the delay criterion is not violated. The following pseudo code describes an algorithm for placing a soft handoff according to the method of the invention.

For a soft handoff requesting skew-group j, do the following:

if (a channel element is available)

```
{
d = S_j + A_j + 1
if(d <= D) ind = 1
else ind = 0
i = j + 1
while ((d > 0) && (ind == 1))
    {
    d = d + A_i
    if (d > D) ind = 0
    d = d - μ
    i = i + 1
    }
if (ind == 1)
    {
    Admit request.
    Set A_j equal to A_j + 1
```

-continued

```
Update S_i as follows:
d = S_j + A_j - μ
i = j + 1
while (d > 0)
    {
    S_j = d
    d = d + A_i - μ
    i = i + 1
    }
}
else
    Reject soft handoff request.
}
else
    Reject soft handoff request.
```

B. Algorithm for Admitting a New Call

In the prior art skew group arrangement, new calls are placed in the skew group carrying the fewest number of calls, as this will generally minimize skew group blocking. Such a "leveling" policy for admission of new calls is generally carried forward by the dynamic skew group algorithm of the invention through assignment of new calls to the skew group with smallest delay—i.e., in the skew group for which $S_i+A_i$ is minimum. If the minimum delay is achieved by more than one skew group, one of the candidate skew groups with minimum delay is chosen at random. As a further embodiment, the choice among such minimum delay skew groups may be directed to the skew group (among the minimum delay groups) whose successor skew group has smallest delay. This decreases the probability that any spillover from the minimum delay group will propagate to other skew groups. The following pseudo code describes the algorithm for placing a new call.

A new call is placed in skew group "best" as follows:

```
min = 2*D;
win = 3*D;
for (i = 0; i < N; i++)
    {
    if ((S_i + A_i < min)) min = S_i + A_i
    }
for (i = 0; i < N; i++)
    {
    if ((S_i + A_i) ==min)
        {
        k= (i == (N-1)) ? 0: i + 1;
        sum = S_i + A_i + A_k;
        if (sum < win)
            {
            win = sum;
            best = i;
            }
        }
    }
```

C. Multiple CDMA Clusters

When multiple CDMA Clusters are available—for example, when multiple CDMA Clusters are shared across sectors of a base station—a strategy for choosing a CDMA Cluster for both originating calls and soft handoffs is needed. The strategy used for new call originations is to choose the least busy CDMA Cluster. Several strategies for choosing a CDMA Cluster to serve a soft handoff are within the contemplation of the methodology of the invention. The preferred strategy would choose that CDMA Cluster (among those with at least one idle channel element) which can support the soft handoff with the least delay in the required skew group. This would require executing the pseudo-code of section A above for each candidate CDMA Cluster and then choosing the cluster with the least delay. An alternative strategy, which would reduce the amount of processing required to determine a choice, would choose the least busy CDMA Cluster, and in the event (generally unlikely) that the soft handoff cannot be handled on the chosen CDMA Cluster, the next least busy CDMA Cluster would be chosen.

Conclusion

A method for achieving substantially lower levels of skew-group blocking in an information transmission system has been described. This objective is accomplished by the invention through statistical sharing of packet delays among skew groups established for such an environment.

Although the present embodiment of the invention has been described in detail, it should be understood that various changes, alterations and substitutions can be made therein without departing from the spirit and scope of the invention as defined by the appended claims. In particular, it will be apparent to those skilled in the art that, while the method of the invention has been described in the context of CDMA wireless technology, a variety of information transmission systems will provide application for the dynamic packet management method of the invention.

What is claimed is:

1. A method for managing connections among competing information sources in a communications system, said information sources periodically generating information packets during timing intervals for said systems, wherein said timing intervals are divided into a plurality of contiguous sub-intervals and said connections may be allocated to ones of said sub-intervals, said method comprising the steps of:

receiving a request from one of said sources for assignment of its connections to a specific one of said sub-intervals;

determining a transmission delay resulting from assignment of a connection for said requesting source to said requested sub-interval on packets of connections assigned to one or more of said sub-intervals; and comparing said transmission delay so determined for each said assigned connection with a maximum delay criterion, said maximum delay criterion being greater than the length of a sub-interval.

2. The method for managing connections of claim 1 wherein the number of said connections accepted by one of said sub-intervals is greater than the maximum number of connections permitted within said timing interval divided by the total number of sub-intervals within said timing interval.

3. The method for managing connection of claim 1 further including a decision step to accept requested assignment to said specific sub-interval if no packet in any of said assigned connections will experience a transmission delay exceeding said maximum delay criterion, and otherwise to reject said requested assignment.

4. The method for managing connections of claim 1 further including the step of allocating connections from sources not requesting assignment to a specific one of said sub-intervals among said sub-intervals according to a pre-determined criterion.

5. The method for managing connections of claim 4 wherein said allocation step operates to cause said connections from sources not requesting assignment to a specific one of said sub-intervals to be assigned to a sub-interval with a minimum delay.

6. The method for managing connections of claim 5 wherein, upon said minimum delay occurring for more than one sub-interval in a given timing interval, one sub-interval among said sub-intervals representing minimum delay is chosen randomly.

7. The method for managing connections of claim 5 wherein, upon said minimum delay occurring for more than one sub-interval in a given timing interval, said assignment is made to a one of said sub-intervals representing minimum delay whose successor sub-interval has the smallest delay.

8. The method for managing connections of claim 1 wherein said communications system is a wireless system and said information sources are mobile stations served by said wireless communications system.

9. In a wireless communications system characterized in that connections among served mobile stations are each allocated to one of a plurality of sub-intervals established within a timing interval for said system, and further characterized in that a mobile station requiring handoff from a first serving base station in said system to a second serving base station in said system must obtain an allocation of its connection to said second base station using a corresponding one of said sub-intervals as was used for its connection to said first base station, method for reducing a blocking probability for establishment of said required sub-interval allocation at said second base station comprising the steps of:

determining a transmission delay resulting from assignment of a connection for said requesting source to said requested sub-interval on packets of connections assigned to one or more of said sub-intervals; and comparing said transmission delay so determined for each said assigned connection with a maximum delay criterion.

10. The method for reducing blocking probability of claim 9 wherein said maximum delay criterion is greater than the length of a sub-interval and the number of said connections accepted by one of said sub-intervals is greater than the maximum number of connections permitted within said timing interval divided by the total number of sub-intervals within said timing interval.

11. The method for reducing blocking probability of claim 2 further including a decision step to accept said requested assignment to said specific sub-interval if no information packet in any of said assigned connections will experience a transmission delay exceeding said maximum delay criterion, and otherwise to reject said requested assignment.

12. A method for processing information packets through a transmission medium, wherein said information packets arrive at said transmission medium from a plurality of competing connections sharing said transmission medium, said method comprising the steps of:

providing, within a timing interval for said transmission medium, a plurality of contiguous sub-intervals, wherein packets may be assigned to ones of said sub-intervals;

receiving a request from a one of said connections for assignment to a specific one of said sub-intervals;

determining a transmission delay resulting from assignment of a connection for said requesting source to said requested sub-interval on packets of connections assigned to one or more of said sub-intervals; and comparing said transmission delay so determined for each said assigned connection with a maximum delay criterion said maximum delay criterion being greater than the length of a sub-interval.

13. The method for processing information packets of claim 12 wherein the number of said connections accepted by one of said sub-intervals is greater than the maximum number of connections permitted within said timing interval divided by the total number of sub-intervals within said timing interval.

14. The method for processing information packets of claim 12 including the further step of allocating packets for connections not requesting assignment to a specific one of said sub-intervals among said sub-intervals according to a predetermined criteria.

15. The method for processing information packets of claim 12 including the further step of allocating packets for connections not requesting assignment to a specific one of said sub-intervals among said sub-intervals according to a predetermined criterion.

16. The method for processing information of claim 15 wherein said step of allocating non-requesting connections operates to cause said non-requesting connections to be assigned to a sub-interval with a minimum delay.

17. The method for managing connections of claim 16 wherein, upon said minimum delay occurring for more than one sub-interval in a given timing interval, one sub-interval among said sub-intervals representing minimum delay is chosen randomly.

18. The method for managing connections of claim 16 wherein, upon said minimum delay occurring for more than one sub-interval in a given timing interval, said assignment is made to a one of said sub-intervals representing minimum delay whose successor sub-interval has the smallest delay.

* * * * *